United States Patent
Dziurda

(10) Patent No.: US 8,939,270 B2
(45) Date of Patent: Jan. 27, 2015

(54) TABBED SEPARATION CLUTCH PLATE

(71) Applicant: GM Global Technology Operations LLC, Detroit, MI (US)

(72) Inventor: Robert Alan Dziurda, Waterford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/846,075

(22) Filed: Mar. 18, 2013

(65) Prior Publication Data

US 2013/0270054 A1    Oct. 17, 2013

Related U.S. Application Data

(60) Provisional application No. 61/624,752, filed on Apr. 16, 2012.

(51) Int. Cl.

| | |
|---|---|
| F16D 13/50 | (2006.01) |
| F16D 13/52 | (2006.01) |
| F16D 13/64 | (2006.01) |
| F16D 13/69 | (2006.01) |

(52) U.S. Cl.
CPC ............ F16D 13/52 (2013.01); F16D 13/648 (2013.01); F16D 13/69 (2013.01)
USPC .................................................. 192/70.28

(58) Field of Classification Search
USPC ...... 192/70.28, 70.27, 71, 85.01, 200, 107 R, 192/108, 107 C, 109 R, 70.251, 70.23, 192/70.22, 70.11
See application file for complete search history.

(56) References Cited

U.S. PATENT DOCUMENTS

| | | | | | |
|---|---|---|---|---|---|
| 2,174,240 | A | * | 9/1939 | Glenney | 192/70.28 |
| 2,738,864 | A | * | 3/1956 | Becker | 192/70.14 |
| 4,058,027 | A | * | 11/1977 | Webb | 475/85 |
| 4,548,306 | A | * | 10/1985 | Hartz | 192/70.28 |
| 8,047,337 | B2 | * | 11/2011 | Strandberg et al. | 188/71.5 |

* cited by examiner

Primary Examiner — Saul Rodriguez
Assistant Examiner — David J Hlavka

(57) ABSTRACT

A multiplate clutch assembly for use in an automotive powertrain is provided that includes a first member, a second member, a plurality of first clutch plates attached to the first member, and a plurality of second clutch plates attached to the second member. The first and second clutch plates are disposed alternatively with one another. At least two of the first clutch plates have separator portions that are configured to contact each other and provide a separation force therebetween. A clutch plate is also provided that includes an annular main body portion defining an aperature therethrough and defining and outer edge and an inner edge. Separator teeth extend from a tooth edge, the tooth edge being one of the inner and outer edges of the main body portion. Each separator tooth is bent at an acute angle with respect to the main body portion.

13 Claims, 5 Drawing Sheets

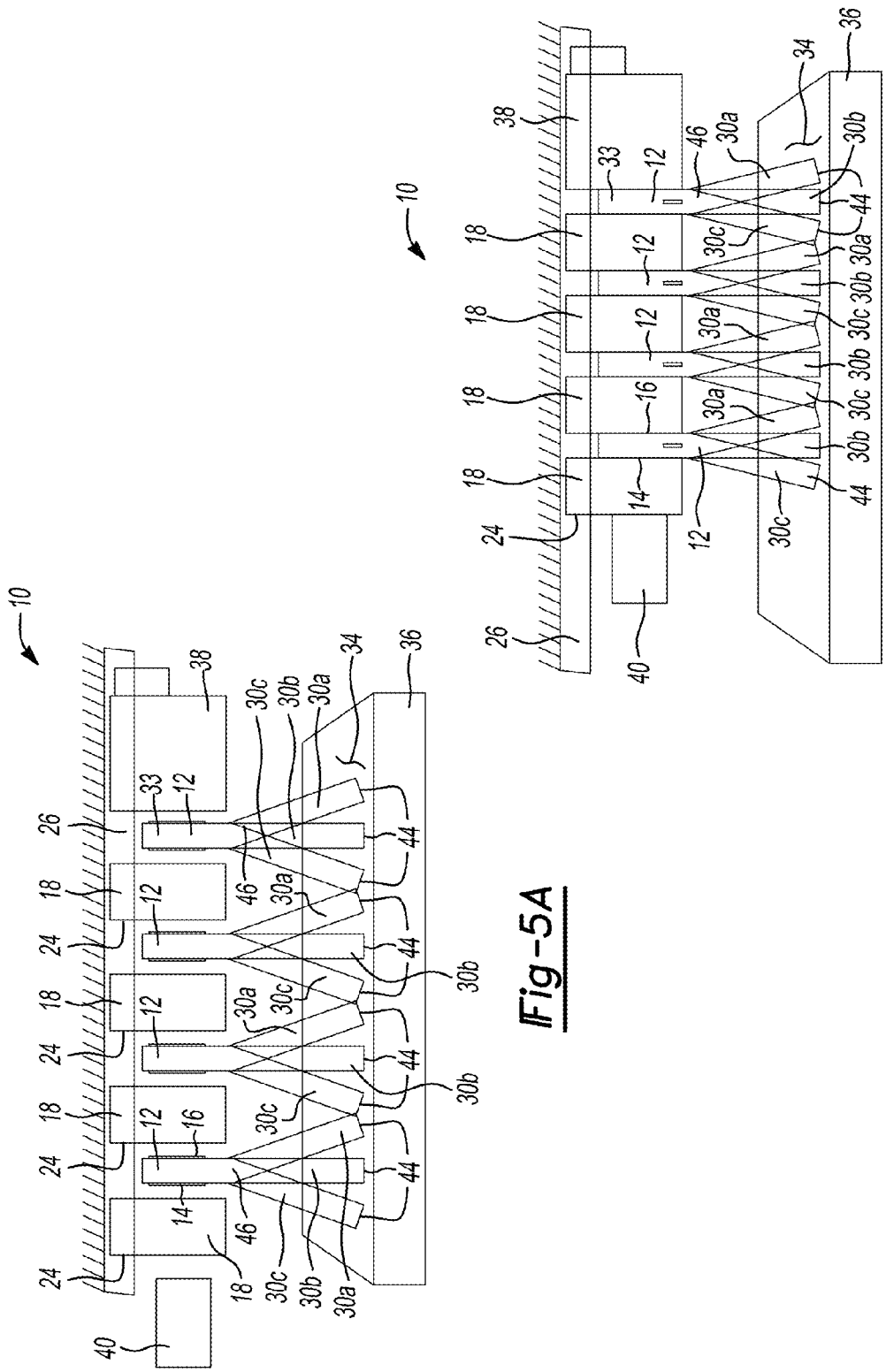

TABBED SEPARATION CLUTCH PLATE

CROSS-REFERENCE TO RELATED APPLICATIONS

This application claims the benefit of U.S. Provisional Application No. 61/624,752 filed on Apr. 16, 2012. The disclosure of the above application is incorporated herein by reference.

FIELD

The present disclosure relates to automotive transmission parts, and more particularly to clutch plates of a friction clutch plate assembly for an automotive transmission.

BACKGROUND

The statements in this section merely provide background information related to the present disclosure and may or may not constitute prior art.

A typical motor vehicle automatic transmission includes gear elements and multiplate clutches that are selectably engageable to establish one of several forward speed ratios between the transmission input and output shafts. The input shaft may be coupled to the vehicle engine through a fluid coupling such as a torque converter, and the output shaft may be coupled to the vehicle drive wheels through a differential gear set.

A multiplate clutch generally includes a set of core plates, usually bearing friction material, a set of separator (or reaction) plates, and a hub, all of which are housed in a clutch case. Spline grooves in the clutch case engage with splines along the outer periphery of either the separator plates or the core plates. Another set of spline grooves in the hub engage with splines around the inner surfaces of either the core plates or the separator plates, i.e., whichever of the plates are not splined to the case are splined to the hub. The separator plates and the core plates are arranged alternately so that they can be engaged or disengaged with each other.

When the multiplate clutch is engaged, the separator plates and the core plates are pushed together, they contact each other and rotate (or are fixed) together, thereby coupling the clutch case and hub to which the plates are attached. When the multiplate clutch is disengaged, the separator plates and the core plates are no longer pushed together, and therefore, the separator plates and the core plates theoretically rotate independently of each other. Sometimes, however, the core plates stick to the separator plates or otherwise remain at least partially contacting the separator plates, even when the multiplate clutch is disengaged. This may result in drag and spin losses within the multiplate clutch. Therefore, it is desired that that core plates and the separator plates fully disengage and separate from each other when the multiplate clutch is disengaged.

SUMMARY

The present disclosure provides a multiplate clutch assembly including a set of clutch plates having ends, or portions, that are configured to contact each other and provide a separation force between the clutch plates.

For example, in one form, a multiplate clutch assembly is provided that includes a set of interleaved clutch plates. The set of interleaved clutch plates includes a plurality of core plates interleaved, or disposed alternatively with, a plurality of separator plates. Either or both of the core plates or the separator plates have ends in contact with each that provide a spring force between the ends. In one embodiment, each core plate has an end that contacts an end of an adjacent core plate. For example, a first core plate has a first end that contacts a second end of a second core plate. The first and second ends contact each other, thereby providing a separation force between the first and second ends. The first and second ends may be bent toward and into contact with each other.

In one form, which may be combined with or separate from the other forms described herein, a multiplate clutch assembly for use in an automotive powertrain is provided. The clutch assembly includes a first member, a second member, a plurality of first clutch plates attached to the first member, and a plurality of second clutch plates attached to the second member. First and second clutch plates of the pluralities of first and second clutch plates are disposed alternatively with one another. At least two first clutch plates have separator portions that are configured to contact each other and provide a separation force therebetween.

In another form, which may be combined with or separate from the other forms disclosed herein, a multiplate clutch assembly for use in an automotive powertrain is provided. The clutch assembly includes an inner member and an outer member. A plurality of annular first clutch plates is attached to the inner member. Each first clutch plate has a first plate main body portion defining a first plate inner edge and a first plate outer edge. A plurality of annular second clutch plates is attached to the outer member. Each second clutch plate has a second plate main body portion defining a second plate inner edge and a second plate outer edge. First and second clutch plates of the pluralities of first and second clutch plates are disposed alternatively with one another. A plurality of separator portions extend from at least one of the first plate inner edges, the first plate outer edges, the second plate inner edges, and the second plate outer edges. Each separator portion is configured to contact another separator portion and provide a separation force therebetween.

In yet another form, which may be combined with or separate from the other forms described herein, a clutch plate for use in a multiplate clutch assembly is provided. The clutch plate includes an annular main body portion defining an aperture therethrough. The annular main body portion defines an outer edge and an inner edge. A plurality of separator teeth extend from a tooth edge, the tooth edge being one of the inner and outer edges of the main body portion. Each separator tooth is bent at an acute angle with respect to the main body portion.

The disclosure also provides, and the invention may include, one or more of the following features: each first and second clutch plate have an annular shape; each first and second clutch plate have a main body portion with an inner edge and an outer edge; each of the separator portions extends from one of the inner and outer edges of the main body portions of a first or second clutch plate; the main body portion of each clutch plate is generally disposed in a plane; each separator portion extends out of the plane of the main body portion from which it extends; each separator portion is unitarily formed with the main body portion of one of the clutch plates; each separator portion is bent out of the plane of the main body portion from which it extends and forms an acute angle with respect to the plane of the main body portion from which it extends; the separator portions are separator teeth that are splined to one of the first and second members; each clutch plate has a plurality of separator teeth extending from one of its inner and outer edges; each separator tooth is configured to contact another separator tooth and to create a separation force therebetween; the plurality of separator teeth include a first plurality of separator teeth bent in a first direction with respect to the clutch plate from which it extends and a second plurality of separator teeth bent in a second direction bent in a second direction with respect to the first clutch plate from which it extends; each clutch plate further comprises a plurality of straight spline teeth extending from one of the inner and outer edges, the straight spline teeth being free from bends therein; the plurality of first clutch plates are core plates and the plurality of second clutch plates are separator plates; the clutch plates have friction material disposed on their main body portions; each separator tooth extends from the inner edge of a clutch plate; the first member is a clutch hub extending through an annular void defined by the first and second clutch plates; the outer member is disposed concentrically around the inner member.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 5A is a schematic side cross-sectional view of the multiplate clutch assembly of FIGS. 1-4 in an unapplied configuration, in accordance with the principles of the present invention; and FIG. 5B is a schematic side cross-sectional view of the multiplate clutch assembly of FIGS. 1-5A in an applied configuration, according to the principles of the present invention.

DETAILED DESCRIPTION

Figure 1:
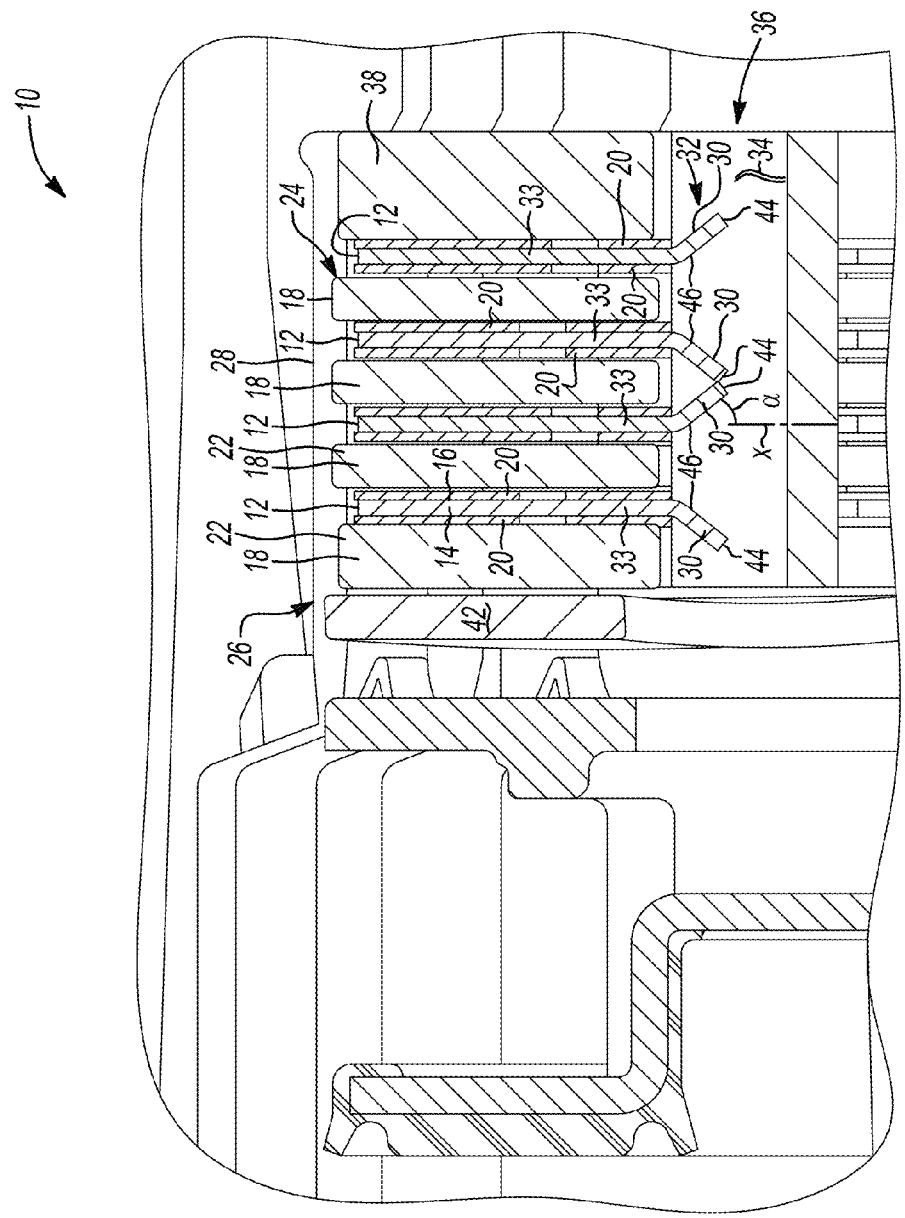
FIG. 1 is a side cross-sectional view of a portion of a multiplate clutch assembly in accordance with the principles of the present invention.
Figure 2:
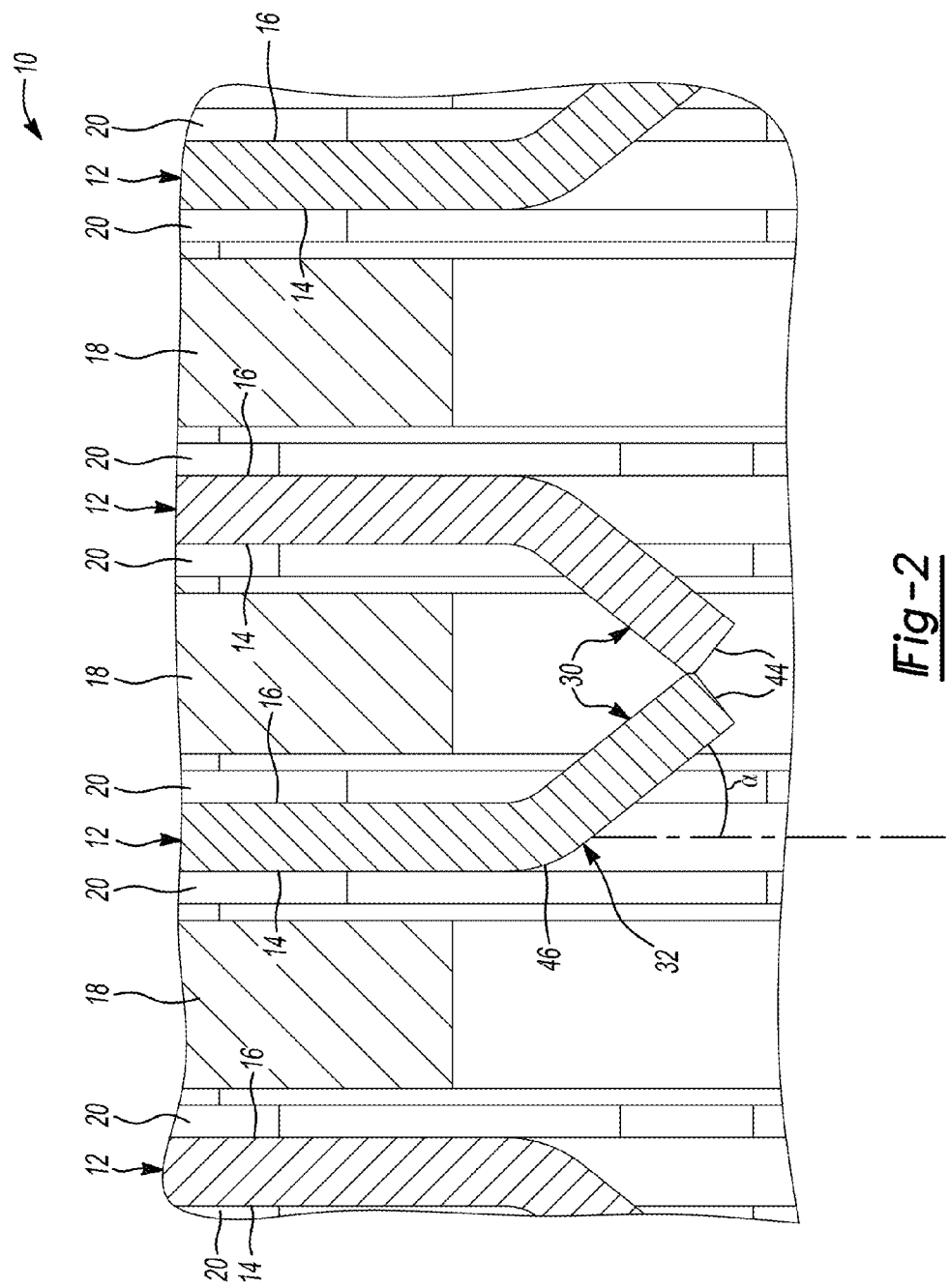
FIG. 2 is a close-up side cross-sectional view of a portion of the multiplate clutch assembly of FIG. 1, according to the principles of the present invention.

The following description is merely exemplary in nature and is not intended to limit the present disclosure, application, or uses.

The present disclosure provides a multiplate clutch assembly having reduced spin loss and drag within its plate clutches by providing a separating force between core plates. The separating force could additionally or alternatively be applied to separator plates. The separating force could be accomplished by attaching springs, such as Belleville springs, to the core plates (and/or the separator plates). The springs could be integrally and unitarily formed with the core plates (and/or the separator plates). For example, in one form, spline teeth of the plates are bent or formed at an acute angle with respect to the plane of the plate. At least one spline tooth of a first plate contacts at least one spline tooth of a second adjacent plate when installed, thus providing a separating force between the adjacent core plates (and/or the separator plates).

Referring now to FIGS. 1-4, wherein like reference numerals indicate like components, a clutch assembly embodying the principles of the present invention is illustrated therein and designated at 10. As its primary components, the clutch assembly 10 includes a set of annular shaped core plates 12, each having a first outer surface 14 and a second outer surface 16, and a set of annular shaped separator or reaction plates 18 arranged alternately with the set of core plates 12. For example, the core plates 12 are interleaved with, and disposed alternatively with, the separator plates 18. Each of the core plates 12 and the reaction plates 18 may be flat or waved. If waved, for example, the core plates 12 could be stamped to have a wavy cross-section.

One or both of the outer surfaces 14, 16 of the core plates 12 may include friction material 20, such as a friction paper, bonded or adhered to the outer surfaces 14, 16. In the illustrated configuration, friction material 20 is bonded to both the first outer surface 14 and the second outer surface 16. In some variations, the separator plates 18 could also have friction material attached to the faces of the separator plates 18.

The separator plates 18 each have a set of teeth 22 extending from an outer edge 24 of each separator plate 18. The teeth 22 of the separator plates 18 engage with longitudinally disposed splines 26 formed in an outer element 28. The outer element 28 may be a part of the transmission case or other stationary element, or the outer element 28 may be a rotating element within the transmission.

The core plates 12 each have a set of teeth 30 extending from an inner edge 32 of a main body portion 33 of each core plate 12. The teeth 30 engage with longitudinally disposed splines 34 formed in an inner member such as a hub 36 (shown in FIG. 1). The hub 36 may be a rotating member, or it may be a stationary member.

In other embodiments (not illustrated), the core plates 12 may have teeth extending from outer edges, rather than the inner edges 32, and the separator plates 18 may have teeth extending from inner edges, rather than the outer edges 24. Thus, in such embodiments, the core plates 12 may be attached to the outer member 28 and the separator plates 18 may be attached to the inner hub 36.

The interleaved core and separator plates 12, 18 are disposed adjacent to a backing plate 38. The backing plate 38 serves as a surface against which the core and separator plates 12, 18 may be applied. The interleaved core and separator plates 12, 18 are selectively engageable to interconnect the outer member 28 with the inner hub 36. Thus, when the clutch assembly 10 is engaged, a piston 40 is operable to compress the plurality of interleaved clutch plates 12, 18 against the backing plate 38. In other words, to engage the clutch assembly 10, the piston 40 presses the core and separator plates 12, 18 against each other and against the backing plate 38, such that one of the clutch plates 12, 18 (in this illustration, one of the core plates 12) abuts and contacts the backing plate 38. A wave plate 42 may be disposed between the piston 40 and the set of clutch plates 12, 18. In this variation, a wave plate 42 is disposed adjacent to a separator plate 18 and contacts the separator plate 18 when the clutch assembly 10 is engaged.

At least one tooth 30 of each core plate 12 has a springed configuration. In the illustrated embodiment, for example, one or more teeth 30 of each core plate 12 has an end 44 that extends at an acute angle α from the plane x of the main body portion 33 of the core plate 12. In the illustrated embodiment, each core plate 12 has a bend 46 in one or more of its teeth 30 resulting in the end 44 being angled with respect to plane x of the main body portion 33. The angled end 44 may be formed, however, in ways other than bending, if desired.

Because the ends 44 are formed or bent at an angle α with respect to the planes x of the core plates 12, adjacent ends 44 of the core plates 12 contact each other when the clutch assembly 10 is unapplied, in other words, when the piston 40 is disposed away from the wave plate 42 and the core and separator plates 12, 18, which is when the piston 40 is not compressing the clutch plates 12, 18. In other embodiments, the ends 44 of the teeth 30 may not touch when the clutch assembly 10 is unapplied, but if the core plates 12 are partially compressed by the piston 40, the ends 44 may then touch (not shown).

Some of the ends 44 of the teeth 30 of the core plates 12 contact each other, and this provides a separation force between the core plates 12. In other words, the ends 44 of the teeth 30 act as springs that push apart the main body portions 33 of the core plates 12. In this way, the core plates 12 will be separated from the separator plates 18 when the clutch assembly 10 is unapplied. The separating force created by the ends 44 of the teeth 30 of the core plates 12 provides clearance between the core plates 12 and the separator plates 18 because the ends 44 contact each other and push the core plates 12 away from the separator plates 18 when the clutch assembly 10 is not engaged. Thus, drag of the separator plates 18 upon the core plates 12 is reduced or eliminated.

Therefore, the spline teeth 30 of the core plates 12 act as springs to separate the core plates 12 from the separator plates 18. The separation force may be tuned by implementing more or fewer touching ends 44. For example, if many ends 44 are angled and touching around the inner circumference of the core plates 12, a greater spring force between adjacent core plates 12 may be provided than if only a few or one toothed end 44 from a core plate 12 is touching another toothed end 44 of an adjacent core plate 12.

Figure 3:
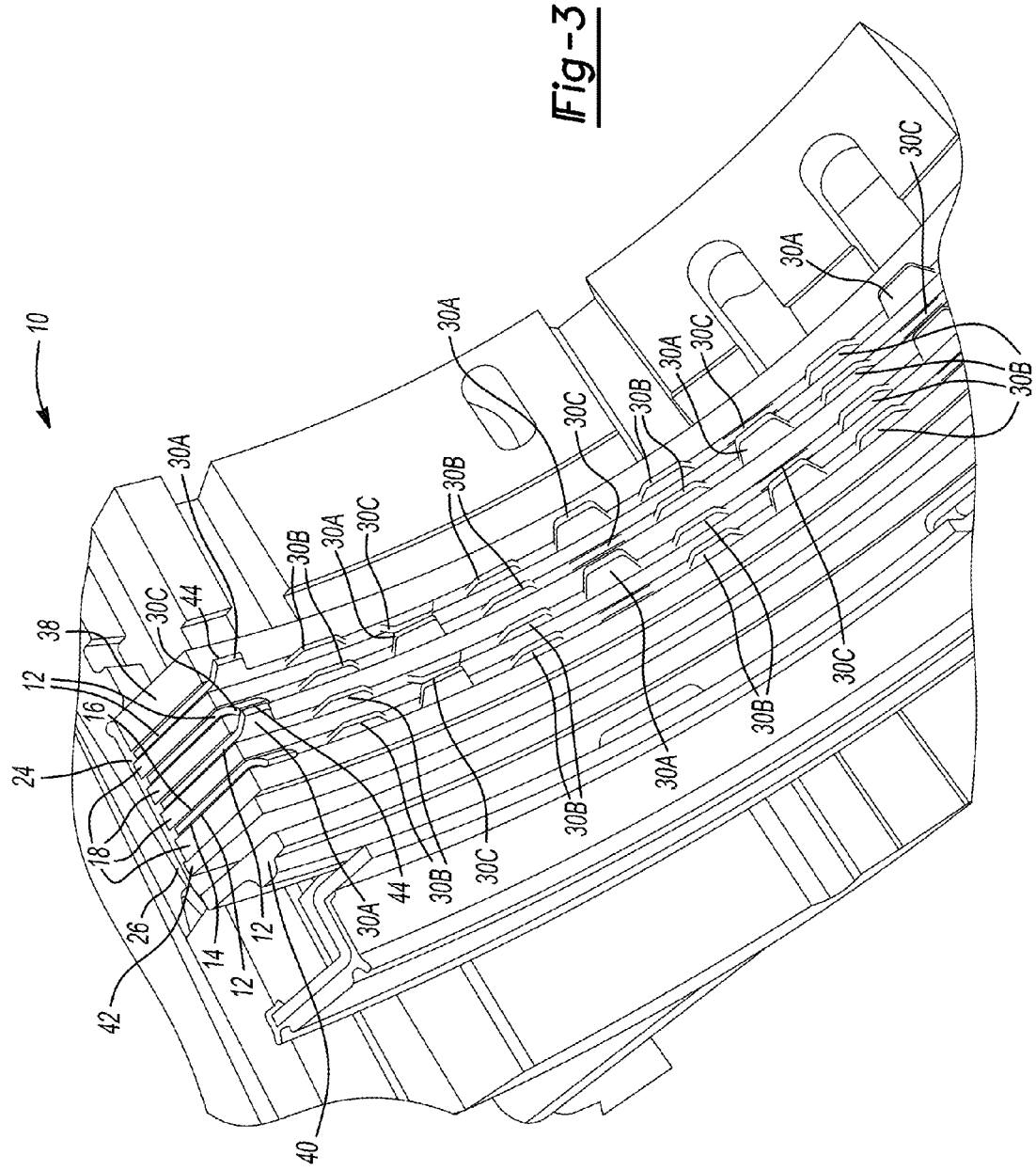
FIG. 3 is a perspective view of a portion of the multiplate clutch assembly of FIGS. 1-2, in accordance with the principles of the present invention.
Figure 4:
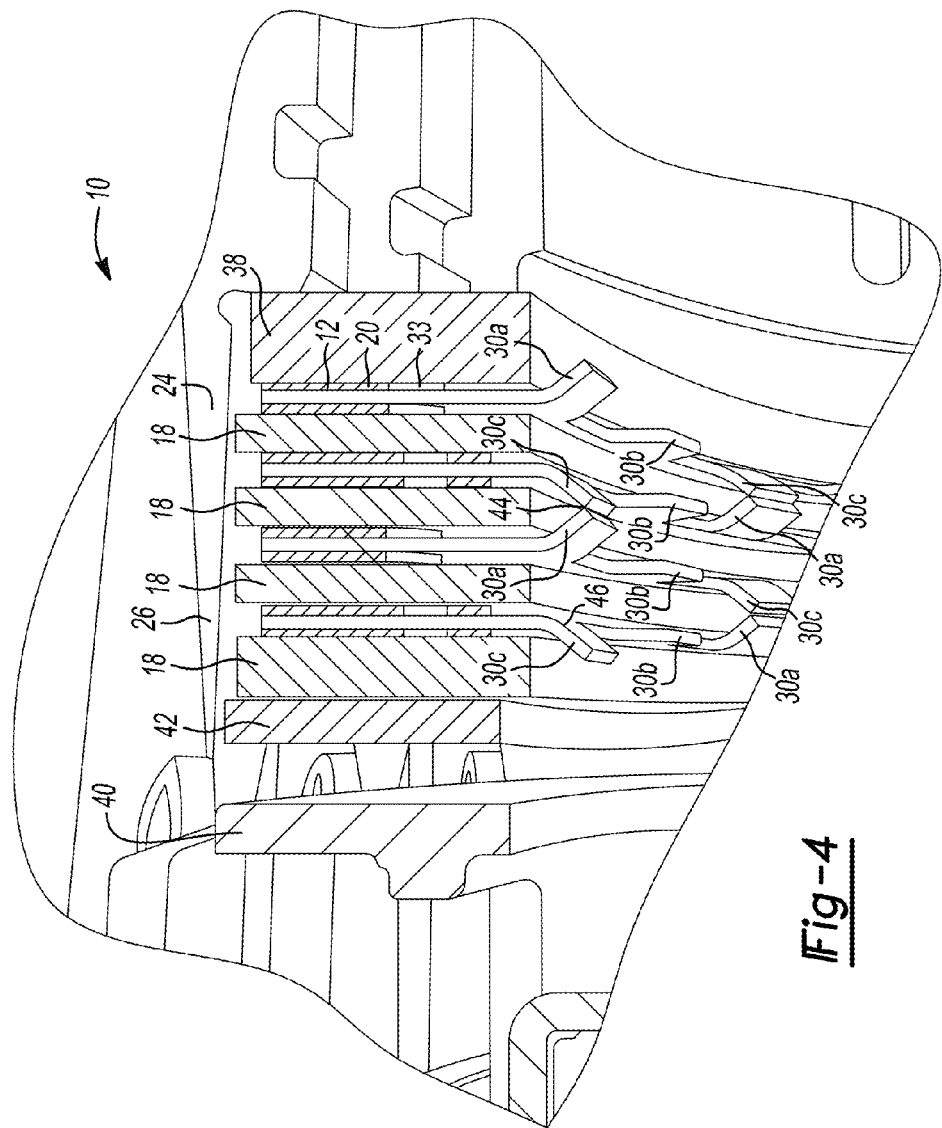
FIG. 4 is a close-up perspective view of a portion of the multiplate clutch assembly of FIGS. 1-3, in accordance with the principles of the present invention.

Referring to FIGS. 3 and 4, a pattern of touching ends 44 is illustrated. Each core plate 30 has a first tooth 30A that is bent in a first direction from the plane x of the core plate 30, a second tooth 30B that is straight and planar with the plane x of the main body portion 33 of the core plate 12, and a third tooth 30C that is bent in a second and opposite direction from the first direction with respect to the plane x of the core plate 12. The pattern of FIGS. 3 and 4 includes alternating first and third bent teeth 30A, 30C separated by straight teeth 30B, and the pattern is repeated around the inner circumference of the core plates 12. If greater spring force is desired, the number of straight teeth 30B may be reduced or eliminated. If lesser spring force is desired, some of the bent teeth 30A, 30C can be alternatively provided as straight teeth 30B. Accordingly, for the core plates 12 that have adjacent core plates 12 on both sides, some of the teeth 30 contact a core plate 12 adjacent to a first side 14 and some of the teeth 30 contact a core plate 12 that is adjacent to a second side 16.

The clutch plates 12, 18 may be formed of steel or any other suitable material. To make the teeth 22, 30 of the separator and core plates 18, 12, each plate 12, 18 is initially stamped or fine blanked. Then, some of the teeth 30 may be bent by stamping or other means to bend the teeth 30A, 30C in one direction. Alternatively, the bending of the teeth 30A, 30C can be formed in a single die/fine blank process or in a progressive die process.

Referring now to FIGS. 5A-5B, the clutch assembly 10 is schematically illustrated in applied and unapplied positions. FIGS. 5A-5B illustrate the same clutch assembly 10 as is shown in FIGS. 1-4, except the wave plate 42 is eliminated. In FIG. 5A, the clutch assembly 10 is unapplied. The ends 44 of certain teeth 30A, 30C of the core plates 30 contact each other and create a spring force between the bent teeth 30A, 30C that pushes the core plates 12 away from the separator plates 18, as explained above.

In FIG. 5B, the clutch assembly 10 is engaged, and the piston 40 compresses the core and separator plates 12, 18 together. Accordingly, the core and separator plates 12, 18 contact each other and fix the outer member 26 and the hub 36 together. The bent teeth 30A, 30C of the core plates 12 remain in contact with adjacent bent teeth 30C, 30A, and each bent tooth 30A, 30C is deflected by the contacting bent tooth 30C, 30A. However, when the piston 40 is moved away from the clutch plates 12, 18, the bent teeth 30A, 30C will exert enough spring force on adjacent contacting bent teeth 30C, 30A to move the core plates 12 away from the separator plates 18 as shown in FIG. 5A.

As an alternative to bending the teeth 30 of the core plates 12 to create a separation force between the core plates 12, springs, such as coil springs or Belleville springs, could be attached to the teeth 30 or an inner part of the main body 33 of the core plates 12 to push apart the core plates 12. Likewise, such springs could be attached to the separator plates 18 to push them apart.

Accordingly, teeth 30 that are described as being bent herein are separator portions of the core plates 12. The teeth 30 may or may not be formed unitarily with the core plates 12. The core plates 12 have a main body portion that is generally disposed within a plane, and the bent teeth 30 extend out of the plane of the main body portion.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiplate clutch assembly for use in an automotive powertrain, the clutch assembly comprising:
   a first member;
   a second member;
   a first plurality of clutch plates attached to the first member;
   a second plurality of clutch plates attached to the second member, wherein a first and second clutch plates of the first plurality of clutch plates are interleaved with a first and second clutch plates of the second plurality of clutch plates;
   wherein at least two clutch plates of the first plurality of clutch plates include a plurality of spline teeth extending from the inner edge of the clutch plates, each of the plurality of spline teeth are separated apart from each other a common distance, the plurality of spline teeth included a first, a second, and a third set of teeth, the first set of teeth are further extended in a first axial direction, the second set of teeth are further extended in a second axial direction opposite the first axial direction, one tooth of the third set of teeth is disposed between one tooth of each the first and the second sets of teeth, and the clutch plates are arranged radially such that each tooth of the first set of teeth of one of the at least two clutch plates are in contact with each tooth of the second set of teeth of a second of the at least two clutch plates and provide a separation force therebetween.

2. The multiplate clutch assembly of claim 1, wherein each first and second clutch plate has an annular shape, each first and second clutch plate having a main body portion with an inner edge and an outer edge.

3. The multiplate clutch assembly of claim 2, wherein each of the plurality of spline teeth is unitarily formed with the main body portion of one of the clutch plates of the first plurality of clutch plates, each tooth of the first and second set of teeth being bent out of the plane of the main body portion from which it extends and forming an acute angle with respect to the plane of the main body portion from which it extends.

4. The multiplate clutch assembly of claim 1, wherein each of the plurality of spline teeth are splined to one of the first and second members.

5. The multiplate clutch plate assembly of claim 4, wherein the first plurality of clutch plates are core plates, the second plurality of clutch plates are separator plates, and the first plurality of clutch plates have friction material disposed on their main body portions.

6. The multiplate clutch assembly of claim 5, wherein each of the plurality of spline teeth extends from the inner edge of a first clutch plate of the first and second plurality of clutch plates, the first member being a clutch hub extending through an annular void defined by the first and second plurality of clutch plates.

7. The multiplate clutch assembly of claim 6, wherein the outer member is disposed concentrically around the inner member.

8. A multiplate clutch assembly for use in an automotive powertrain, the clutch assembly comprising:
- an inner member;
- an outer member;
- a first plurality of annular clutch plates attached to the inner member, each of the clutch plates of the first plurality of annular clutch plates having a first plate main body portion defining a first plate inner edge and a first plate outer edge;
- a second plurality of annular clutch plates attached to the outer member, each of the clutch plates of the second plurality of annular clutch plates having a second plate main body portion defining a second plate inner edge and a second plate outer edge, wherein a first and second clutch plates of the first plurality of clutch plates are interweaved with a first and second clutch plates of the second plurality of clutch plates;
- wherein at least two clutch plates of the first plurality of clutch plates include a first plurality of spline teeth extending from the inner edge of the clutch plates, at least two clutch plates of the second plurality of clutch plates include a second plurality of spline teeth extending from the outer edge of the clutch plates, each of the first plurality of spline teeth are separated apart from each other a common distance, each of the second plurality of spline teeth are separated apart from each other a common distance, each of the first and second plurality of spline teeth included a first, a second, and a third set of teeth, the first set of teeth are further extended in a first axial direction, the second set of teeth are further extended in a second axial direction opposite the first axial direction, on each of the first and the second plurality of clutch plates one tooth of the third set of teeth is disposed between one tooth of each the first and the second sets of teeth, and the at least two clutch plates of each of the first and the second plurality of clutch plates are arranged radially such that each tooth of the first set of teeth of one of the at least two clutch plates are in contact with each tooth of the second set of teeth of a second of the at least two clutch plates and provide a separation force therebetween.

9. The multiplate clutch assembly of claim 8, wherein each first plate main body portion is generally disposed in a plane and each second plate main body portion is generally disposed in a plate, each tooth of the first and second plurality of teeth extend from and out of the plane of one of the following: one of the first plate main body portions and one of the second plate main body portions.

10. The multiplate clutch assembly of claim 9, wherein each tooth of the first and second plurality of teeth is unitarily formed with one of the following: one of the first plate main body portions and one of the second plate main body portions.

11. The multiplate clutch plate assembly of claim 10, wherein the first plurality of clutch plates are core plates and the second plurality of clutch plates are separator plates, the first plurality of clutch plates having friction material disposed on their main body portions.

12. The multiplate clutch assembly of claim 6, wherein each tooth of the first and second plurality of teeth extends from the inner edge of one of the clutch plates of the first plurality of clutch plates, the first member being a clutch hub extending through an annular void defined by the first and second clutch plates, the outer member being disposed concentrically around the inner member.

13. A clutch plate for use in a multiplate clutch assembly, the clutch plate comprising:
- an annular main body portion defining an aperture therethrough, the annular main body portion defining an outer edge and an inner edge;
- a plurality of spline teeth extending from the tooth edge of the clutch plate, the tooth edge being one of the inner and outer edges of the main body portion, each of the plurality of spline teeth are separated apart from each other a common distance, the plurality of spline teeth included a first, a second, and a third set of teeth, the first set of teeth are further extended in a first axial direction, the second set of teeth are further extended in a second axial direction opposite the first axial direction, one tooth of the third set of teeth is disposed between one tooth of each the first and the second sets of teeth.

* * * * *